May 18, 1954  E. HOFFMEISTER ET AL  2,678,494
DENTAL DRILLING, MILLING, AND GRINDING TOOL
Filed March 19, 1951
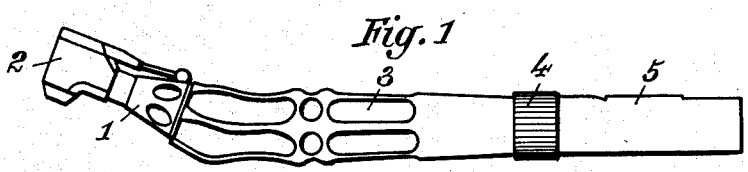
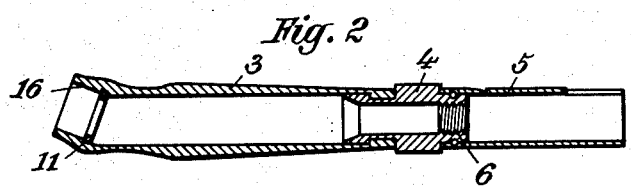
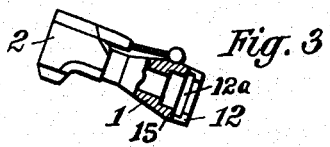
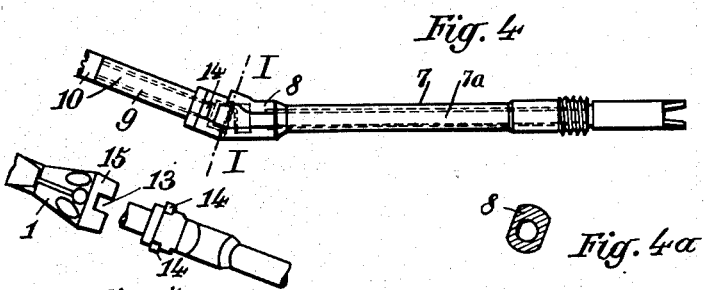
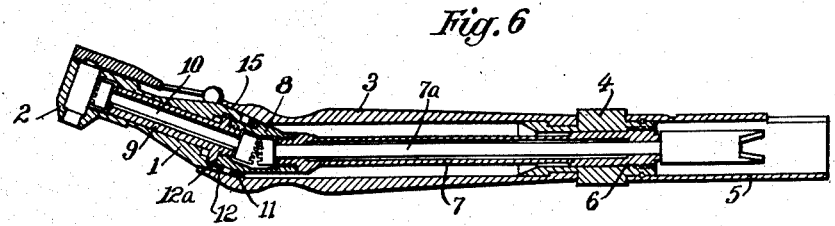
Inventors
E. Hoffmeister
K. Böhm
by
Attorneys Patented May 18, 1954

2,678,494

UNITED STATES PATENT OFFICE 2,678,494

DENTAL DRILLING, MILLING, AND GRINDING TOOL

Erich Hoffmeister and Kurt Röhm, Biberach-Riss, Germany

Application March 19, 1951, Serial No. 216,304

Claims priority, application Germany March 22, 1950

7 Claims. (Cl. 32—27)

This invention relates to an angle piece with an angle connecting shafting for dental drilling, milling and grinding tools, in which a sleeve covering the upper drive and the entire adjoining drive bearing is removably attached to the shafting and can be withdrawn together with the head from the drive bearing. With such angle pieces the attachment of the sleeve to the shafting is effected by a spring-loaded pin fixed to the handle part so that when the sleeve is displaced said spring snaps into a corresponding recess of the sleeve. For fixing the sleeve to the shafting in different rotary positions with respect to the latter in a readily releasable manner, the rim of the sleeve is provided with holes distributed around the entire periphery for the engagement of the spring-loaded pin.

For preventing unintentional release of the sleeve from the part containing the shafting, it has also already been proposed to shift the actuating knob for the spring-loaded pin out of the range of the finger rests more towards the rearward end of the holding sleeve and to give the spring-loaded pin a corresponding construction.

The invention has for its object to provide an effective fixing arrangement which does away with the hitherto generally used spring-loaded pin.

According to the invention it is proposed that the rear end of the sleeve attached to the head together with the angle connecting shafting fixed to the forward end of the lower drive bearing be constructed in such a manner that they can be secured like a bayonet joint and be made fast by means of a clamping nut having an internal thread, which nut is rotatable at the rearward end of the holding sleeve, but is not axially displaceable, and engages with a corresponding external thread of the axially displaceable lower drive bearing. The reliable securing of the sleeve attached to the head, when tightening up the clamping nut, is effected through a conically tapering rear end of the sleeve of the head engaging a corresponding internal cone at the forward end of the holding sleeve.

Before tightening up the clamping nut the sleeve provided with the head is locked to the holding part in a bayonet-like manner. For this purpose the lower end of the sleeve fixed to the head has an inwardly projecting collar and diametrically opposite slots, whilst the forward end of the angle connecting shafting is provided with diametrically opposite lugs which, after entering into the slots of the sleeve and after the sleeve has been turned, engage over the inwardly projecting collar at the end of the sleeve. After being thus secured in the manner of a bayonet joint, the sleeve with the head can by turning the clamping nut be drawn up tightly without any play against the angle connecting shafting and against the holding sleeve. Before the nut is tightened up, the head may be brought into any desired angular position with respect to the holding sleeve.

The angle connecting shafting is secured against turning in the forward end of the holding sleeve, this being preferably effected by the insertion into the forward end of the holding sleeve of a profiled ring, in which the correspondingly profiled external periphery of the shafting is guided.

The invention is applicable both to angle pieces with angle connecting shafting, which can be releasably secured by means of a connecting sleeve to a sliding connection sleeve, and to angle pieces with angle connecting shafting, which are releasably fixed to a straight dental hand piece through a base sleeve engageable over the end of a sheath of said latter hand piece.

An angle piece with angle connecting shafting constructed in accordance with the invention is illustrated by way of example in the accompanying drawing, in which:

Fig. 1 shows a side view of an angle piece with angle connecting shafting,

Fig. 2 is a longitudinal section of the holding sleeve with clamping nut and connecting sleeve, Fig. 3 shows the rear part of the sleeve provided with the head in longitudinal section, partly in elevation, Fig. 4 shows the middle drive and the lower drive with bearings and the angle connecting shafting in elevation, Fig. 4a shows the angle connecting shafting in section on line I—I of Fig. 4, Fig. 5 shows the rear end of the sleeve of the head and the angle connecting shafting in elevation, viewed from the rear, and Fig. 6 is a longitudinal section of an angle piece with angle connecting shafting and clamping nut and the means for connecting these portions together.

In Figs. 1 and 3, the part 1 is the sleeve covering the middle drive bearing, which at its forward end carries the tool holding head portion 2 of the angle piece, 3 the holding sleeve, 4 the clamping nut at the rear end of the holding sleeve and 5 the connecting sleeve.

As will be seen from Fig. 2, there is provided at the rear end of the holding sleeve 3 the externally knurled clamping nut 4 which is rotatable, but not axially displaceable thereon. On the rear neck of the clamping nut 4 is mounted the connecting sleeve 5, also rotatable and not axially displaceable. The clamping nut 4 has an internal thread 6, into which is screwed the external thread of the rear bearing 7 for the lower drive 7a. At the forward end of the lower drive bearing is mounted the angle connecting shafting 8, at the forward end of which is fixed the bearing 9 of the middle drive 10. In the forward end of the holding sleeve 3 is inserted a profiled ring 11 which guides the correspondingly profiled outer surface of the angle connecting shafting. This ring 11 is preferably fixed by soldering to the holding sleeve 3 and its inner circumference is adapted to correspond with the outer circumference of the rear part of the angle connecting shafting (Fig. 6). In this way any turning of the angle connecting shafting with respect to the holding sleeve 3 is prevented. The rear end of the sleeve 1 has an inwardly projecting collar 12 and is provided with diametrically opposite slots 13, so that the sleeve 1 can be slipped on to the forward part of the angle connecting shafting. The forward part of the latter shafting is provided with diametrically opposite lugs 14 which are preferably fixed by soldering and which enter the slots 13, when the sleeve 1 is slipped on. As soon as the lugs 14 abut against the bottom of the slots 13, the sleeve 1 can be turned whereupon the lugs 14 will enter groove 12a and engage over the collar 12 at the rear end of the sleeve 1. In this way a bayonet-like lock between the sleeve 1 and the shafting 8 is established. Upon the clamping nut 4 being then turned, the lower drive bearing 7 with the shafting 8 will be drawn axially rearwards. At the same time the sleeve 1 will be drawn with its externally conically tapered end 15 into the corresponding internal cone 16 at the forward end of the holding sleeve 3 and held there nondisplaceably. Before the nut 4 is tightened, the sleeve provided with the head portion 2 can be brought into any desired angular position with respect to the holding sleeve 3 since the lugs 14 can rotate unhindered in the groove 12a.

For the removal of the sleeve 1 provided with the head portion 2 all that is necessary is to slightly loosen the clamping nut 4, whereupon the sleeve 1 can be turned relatively to the angle connecting shafting so far that the lugs 14 enter the slots 13, when the sleeve can be readily slipped off the middle drive bearing 9.

We claim:

1. An angle piece with angle connecting shafting for dental tools, comprising: a headpiece, a sleeve attached to the headpiece, a bayonet joint removably connecting the rear end of the said sleeve to an angle connecting shafting, a holding sleeve, a lower drive bearing the forward end of which is fixed to the shafting, an external screw thread on the lower drive bearing and a clamping nut engaging with the said screw thread for securing the head portion firmly to the forward end of the lower drive bearing, the said clamping nut being supported at the rear end of the holding sleeve to permit it being rotatable but not axially displaceable thereon.

2. An angle piece as claimed in claim 1, having the forward end of the holding sleeve formed with an internally conical aperture, and the rear end of the headpiece sleeve conically tapered to inter-engage in said conical aperture.

3. An angle piece with an angle connecting shafting for dental tools, comprising: a headpiece, a sleeve attached to the headpiece, an inwardly projecting collar on the rear end of the sleeve attached to the headpiece, the rear end of the said sleeve being formed with diametrically opposite slots, diametrically opposite lugs on the forward end of the shafting adapted to enter the said slots and to engage behind the said inwardly projecting collar when the sleeve has been turned, a holding sleeve, a lower drive bearing the forward end of which is fixed to the shafting, an external screw thread on the lower drive bearing, and a clamping nut engaging with the said screw thread for securing the head firmly to the forward end of the lower drive bearing, the said clamping nut being supported at the rear end of the holding sleeve to permit it being rotatable but not axially displaceable thereon.

4. An angle piece as claimed in claim 1, further comprising a profiled ring inserted into the forward end of the holding sleeve, the external surface of the shafting being correspondingly profiled and being guided in the said ring so as to secure the shafting against turning relatively to the holding sleeve.

5. A contra angle attachment comprising a separably connected headpiece with a sleeve at one end, an angle connecting shafting and a holding sleeve, said headpiece having an interfitting relationship with said holding sleeve, a bayonet joint formed on the sleeve of the said headpiece and said angle connecting shafting, said holding sleeve being engageable with the sleeve of the said headpiece over said bayonet joint for confining said joint in holding relationship, and said holding sleeve having means adapted to be manually operable to secure the sleeve of said headpiece and said holding sleeve firmly together in interfitting relationship with one another.

6. A contra angle attachment as claimed in claim 5, further comprising means interposed between said holding sleeve and said shafting to prevent relative rotation between the shafting and the forward end of said sleeve.

7. An angle piece with angle connecting shafting for dental tools, comprising: a headpiece, a sleeve attached to the headpiece, a bayonet joint removably connecting the rear end of said sleeve to an angle connecting shafting, a holding sleeve the forward end of which is formed with an internally conical aperture, the rear end of the sleeve attached to the headpiece being conically tapered and engageable in said conical aperture, a lower drive bearing within said holding sleeve and having the forward end thereof fixed to said angle connecting shafting, an external screwthread on said lower drive bearing and clamping means engageable with said screw-thread for securing the head portion firmly to the forward end of the lower drive bearing, said clamping means being adapted to be supported at the rear end of the holding sleeve to permit it being rotatable but not axially displaceable thereon.

References Cited in the file of this patent

UNITED STATES PATENTS

| Number | Name | Date |
| --- | --- | --- |
| 1,534,817 | Thiedemann et al. | Apr. 21, 1925 |
| 2,370,632 | Blair | Mar. 6, 1945 |

FOREIGN PATENTS

| Number | Country | Date |
| --- | --- | --- |
| 888,449 | France | Sept. 6, 1943 |